US006959203B2

(12) United States Patent
Claxton et al.

(10) Patent No.: US 6,959,203 B2

(45) Date of Patent: Oct. 25, 2005

(54) PORTABLE COMMUNICATION DEVICE USED AS AN ACCESSORY FOR A MOBILE COMMUNICATION SYSTEM

(75) Inventors: Bruce A. Claxton, Coral Springs, FL (US); Anthony J. Cecchin, Cary, IL (US); Charles F. Jackson, Crystal Lake, IL (US); Scott H. Richards, Plantation, FL (US); Jerry L. Sandvos, deceased, late of Davie, FL (US); by Carole Sandvos, legal representative, Davie, FL (US); Charles B. Swope, Coral Springs, FL (US); Peter Gilmore, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 55 days.

(21) Appl. No.: 10/245,134

(22) Filed: Sep. 17, 2002

(65) Prior Publication Data

US 2004/0203510 A1 Oct. 14, 2004

(51) Int. Cl.[7] .............................................. H04M 1/00

(52) U.S. Cl. .................... 455/556.1; 455/66.1; 455/74; 455/557; 455/569.1; 455/90.1; 455/90.2

(58) Field of Search ......................... 455/66.1, 74, 557, 455/550.1, 569.1, 569.2, 90.1, 90.2, 90.3, 455/556.1

(56) References Cited

U.S. PATENT DOCUMENTS

| | | | | |
|---|---|---|---|---|
| 5,179,721 | A | 1/1993 | Comroe, et al. | |
| 5,239,674 | A | 8/1993 | Comroe, et al. | |
| 5,313,654 | A | 5/1994 | Comroe, et al. | |
| 5,371,898 | A | 12/1994 | Grube | |
| 5,446,553 | A | 8/1995 | Grube | |
| 5,940,767 | A * | 8/1999 | Bourgeois et al. | 455/466 |
| 5,991,640 | A * | 11/1999 | Lilja et al. | 455/557 |
| 6,226,529 | B1 * | 5/2001 | Bruno et al. | 455/557 |
| 6,230,029 | B1 * | 5/2001 | Hahn et al. | 455/575.2 |
| 6,314,303 | B1 * | 11/2001 | Phipps | 455/555 |
| 6,480,714 | B1 * | 11/2002 | DePani et al. | 455/422.1 |

* cited by examiner

*Primary Examiner*—Vivian Chin
*Assistant Examiner*—Minh D. Dao
(74) *Attorney, Agent, or Firm*—Terri S. Hughes; Barbara R. Doutre

(57) ABSTRACT

In one embodiment, a two-way radio console (600) and a portable communication device (100) comprise a mobile communication system in accordance with the present invention. The two-way radio console (600) has a docking interface (602) formed therein. The portable communication device is capable of coupling to the two-way radio console via the docking interface. Further, the portable communication device is capable of selectively functioning as an accessory for the two-way radio console and as a standalone communication device when coupled to the two-way radio console. In this embodiment, the accessory is at least one of the following: a microphone, a speaker, and a two-way controller.

11 Claims, 9 Drawing Sheets

PORTABLE COMMUNICATION DEVICE USED AS AN ACCESSORY FOR A MOBILE COMMUNICATION SYSTEM

REFERENCE TO RELATED APPLICATIONS

The present application is related to the following U.S. applications commonly owned together with this application by Motorola, Inc.: Ser. No. 10/245,097, filed Sep. 17, 2002, titled "Charging Device for Charging a Plurality of Devices" by Richards et al.; Ser. No. 10/245,137, filed Sep. 17, 2002, titled "Portable Communication Device used as an Accessory for a Portable Two-Way Radio" by Richards et al.; Ser. No. 10/245,244, filed Sep. 17, 2002, titled "Method and Apparatus for Improved Location Determination in a Private Radio Network Using a Public Network System" by Wong et al.; and Ser. No. 10/245,221, filed Sept. 17, 2002, titled "Bridging Talk Groups in Communications Systems" by Wong et al.

FIELD OF THE INVENTION

This invention relates generally to communication devices, and more particularly to the ability of those devices to functionally and physically adapt to various usage environments.

BACKGROUND OF THE INVENTION

Communication systems play a critical role in public safety. Remote speaker microphones are used in conjunction with portable two-way radios to increase a user's mobility. Public safety personnel, for example, fire fighters, police officers, and medical rescue personnel, typically use these devices. These users are also beginning to increasingly rely on their cellular telephones for non-critical communication. Cellular telephones typically lack high audio capability making them unsuitable for most public safety applications. The ability to have a cellular telephone operate in the public safety arena would be highly beneficial to public safety users.

Wireless personal digital assistant ("PDA") devices are also being required of some public safety personnel, presenting an additional device to be carried by the user. The proliferation of communication devices, such as telephones, pagers, PDAs, and two-way radios, increases the number of user interface points that may lead to user confusion. The overcrowding of devices worn on the user's belt or pockets can also become burdensome and uncomfortable for the user. Additionally, although carried by a single user, all of these devices must be charged separately requiring multiple accessories.

Tracking public safety personnel has become increasingly important to public safety communications as well. Vehicle based public safety personnel typically use two-way radio systems, however many vehicle based mobile radios are limited to in-vehicle use only. Public safety users may need to leave their vehicle and thus public safety agencies need the ability to track location within and outside of the vehicle. To do so without adding devices to the vehicle or requiring additional devices to be worn by the user is again highly desirable.

Combining functionality and adding features to communications products presents challenges to designers. Design parameters that are considered include battery life, audio quality, display functionality, communication range, charger capability, form factors, and ruggedness. Thus, it would be desirable to have multiple communication devices take on new functional capabilities.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1A:
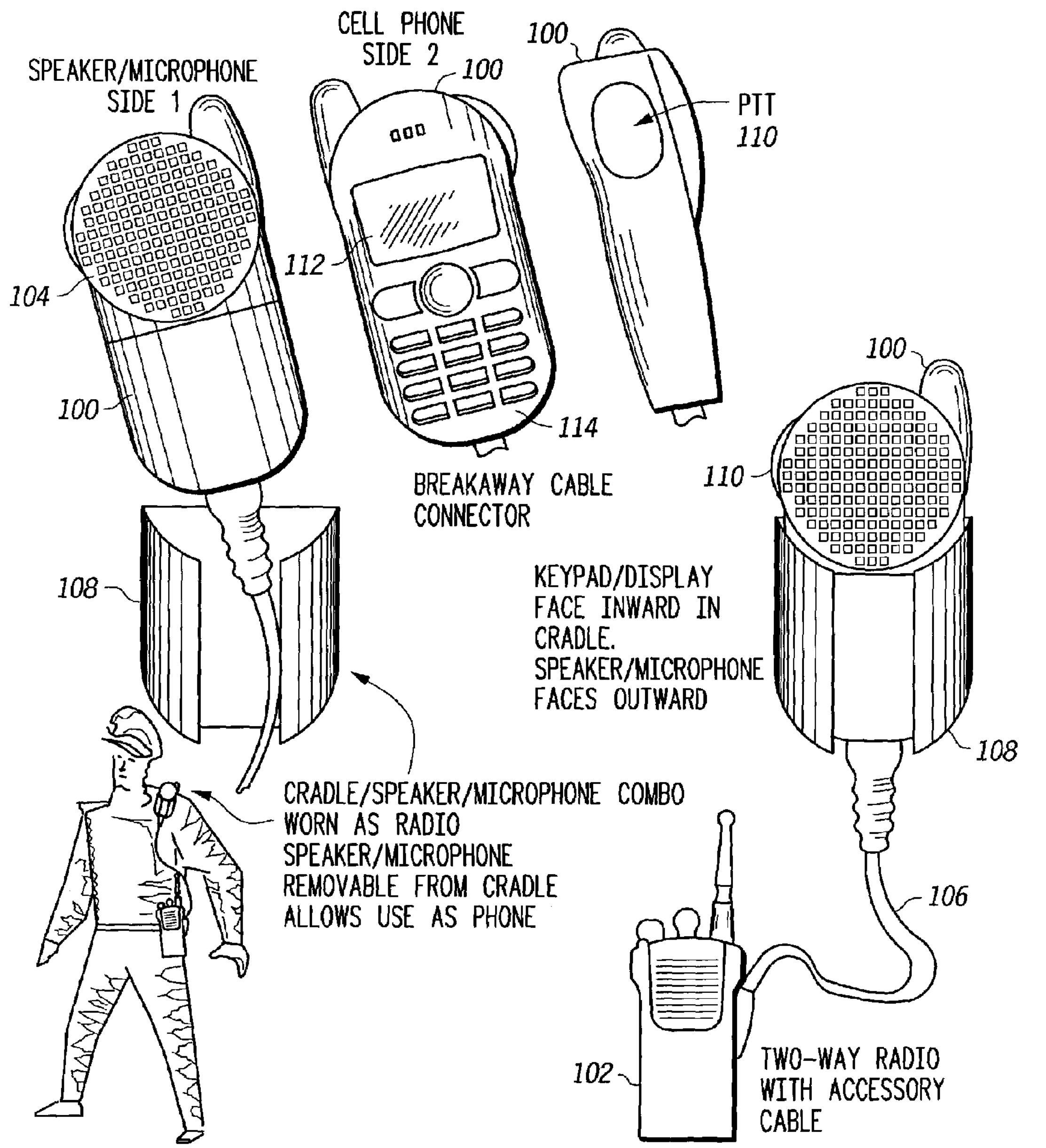
FIG. 1A illustrates an example of a high audio portable communication device directly coupled to a portable two-way radio in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

The present invention provides various embodiments of a portable communication device operating as an accessory (i.e., a high audio speaker/microphone) for a portable two-way radio operating over a private or public system. The portable communication device is selected from a group consisting of, but not limited to, a cellular telephone, a personal digital assistant ("PDA"), a pager, a two-way radio, any combination thereof, or the like.

Figure 1B:
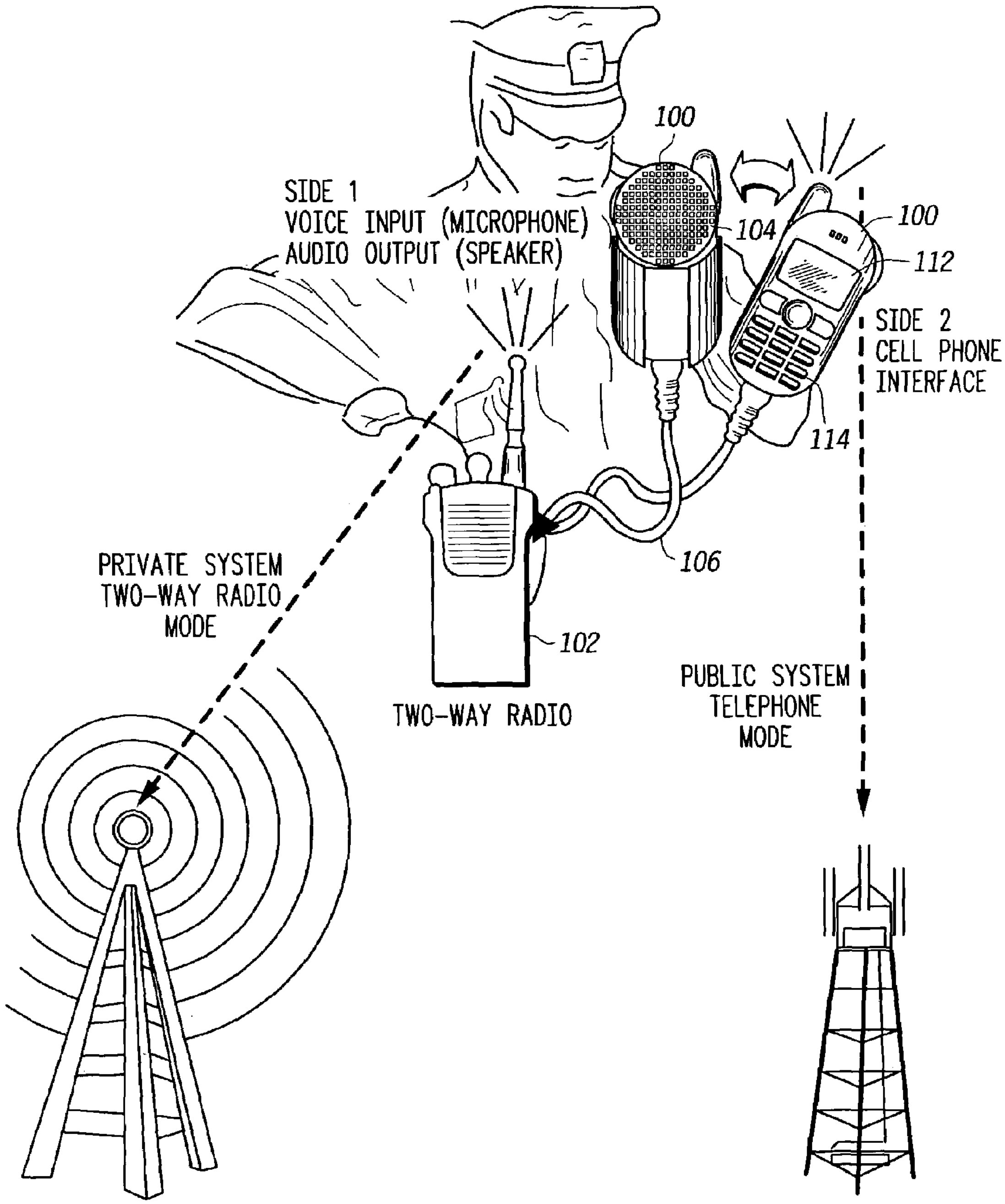
FIG. 1B illustrates an example of the high audio portable communication device directly coupled to a portable two-way radio in accordance with the present invention

Referring to FIGS. 1A and 1B, the portable communication device 100 functions in its intended/standard mode of operation when operating as a stand-alone device in its intended environment. For example, if the portable communication device 100 is a cellular telephone, its intended mode of operation is to provide cellular telephone services; if the portable communication device 100 is a PDA, its intended mode of operation is a handheld computing device. The portable communication device 100 may have similar functionalities of a laptop or desktop computer including, but not limited to, email capabilities, calendar maintenance, word/data processing, spreadsheet capabilities, contact list generation, internet surfing or the like; the portable communication device 100 may even be configured with a wireless local area network ("WLAN") personal computer memory card international association ("PCMCIA") card or a compact flash card for wireless access.

The portable communication device 100, however, functions as a speaker/microphone when operating as an accessory for the two-way radio 102 (i.e., when coupled to the two-way radio) in accordance with the present invention. When coupled to the two-way radio 102, the portable communication device 100 preferably becomes the button/display control device for the two-way radio 102 (e.g., the portable communication device becomes a data display device for PIM applications); preferably, the portable communication device 100 would also function as a display device for graphics depending on the complexity of the portable communication device 100.

In a first embodiment, the portable two-way radio 102 described with respect to the present invention can be any standard or customized portable two-way radio currently used in the industry today, particularly in the public safety environment. Some examples of a suitable portable two-way radio are the XTS 3000, XTS 3500, XTS 2500, XTS 5000, and Astro™ Saber radios manufactured by Motorola, Inc.

As illustrated in FIG. 1, the portable communication device 100 preferably comprises an integral speaker/microphone 104 in accordance with the present invention. If the portable communication device 100 has a high audio speaker 104, the portable communication device 100 preferably couples directly to the portable two-way radio 102 via a wireless interface (not shown) or via an electrical interface through a suitable accessory cable 106 having breakaway capabilities. It should be noted that when connected to the accessory cable 106, directly or indirectly, both the portable communication device 100 and the portable two-way radio 102 could have any variety and number of well-known sensor techniques that would allow each device to detect the presence of the other device via one of the interfaces.

Figure 2:
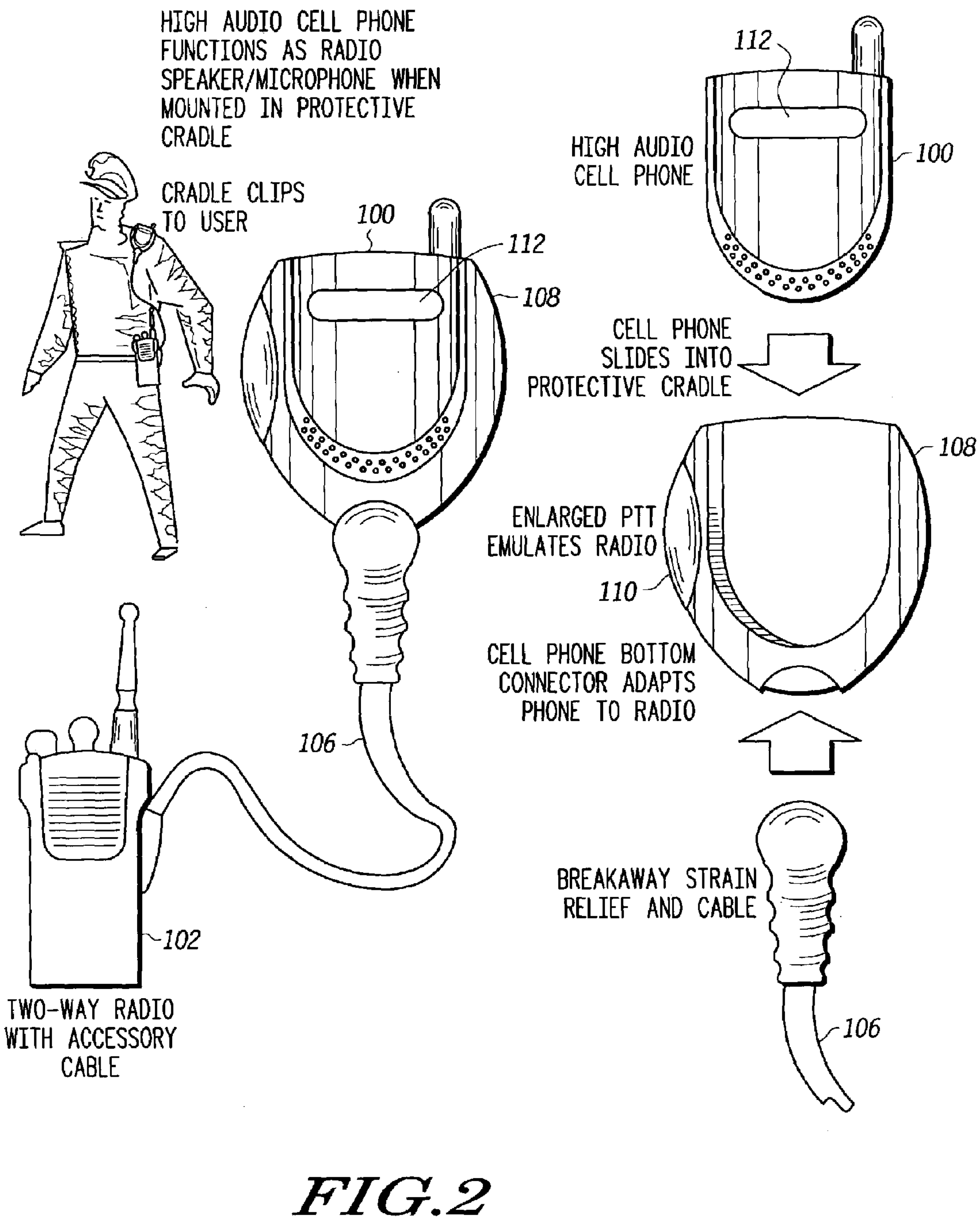
FIG. 2 illustrates an example of the high audio portable communication device indirectly coupled to the portable two-way radio via a cradle in accordance with the present invention.
Figure 3:
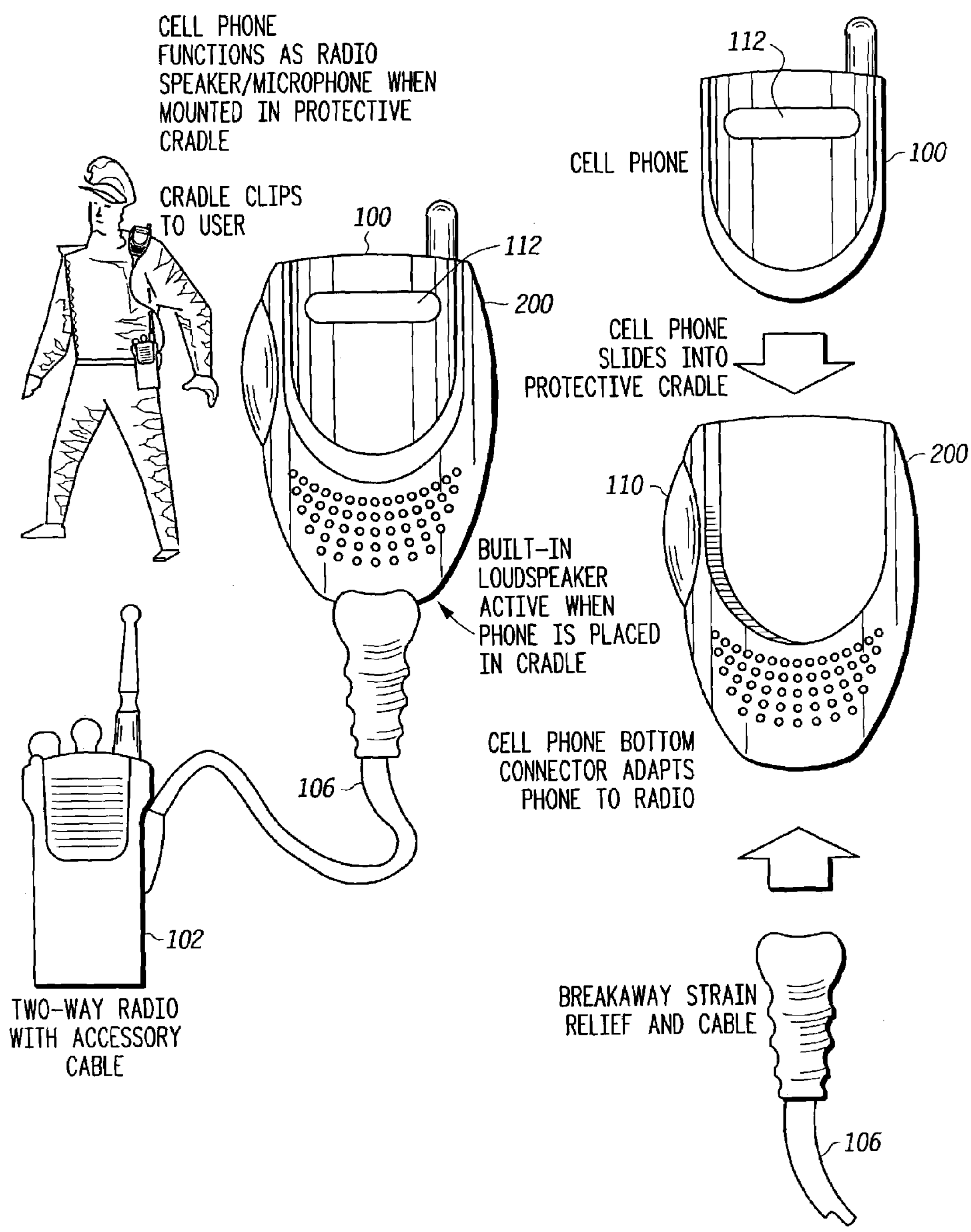
FIG. 3 illustrates an example of a low audio portable communication device indirectly coupled to the portable two-way radio via a cradle with a built-in loudspeaker in accordance with the present invention.
Figure 4:
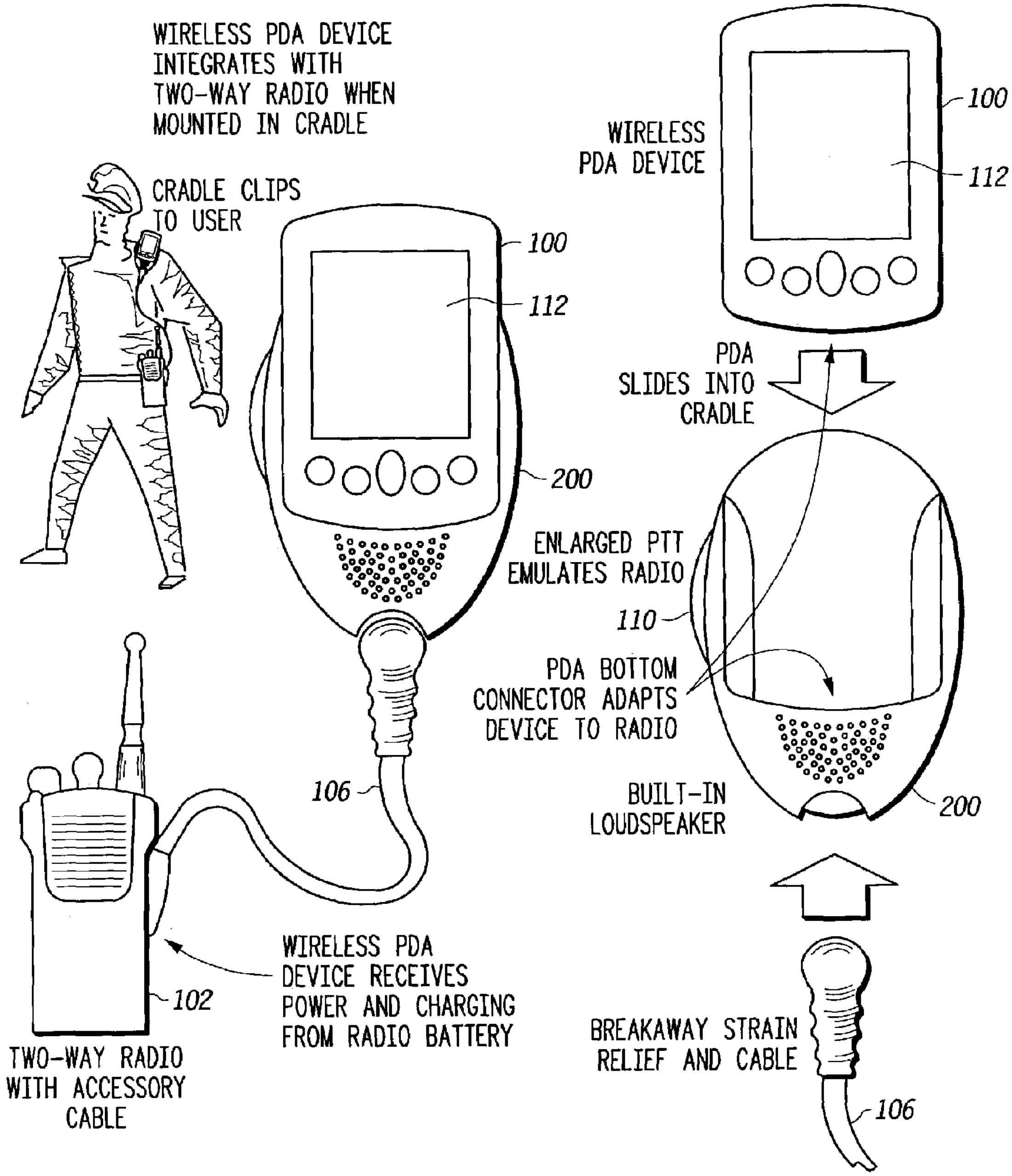
FIG. 4 illustrates another example of the low audio portable communication device indirectly coupled to the portable two-way radio via a cradle with a built-in loudspeaker in accordance with the present invention.

Alternatively, the portable communication device 100 can couple to the portable two-way radio 102 indirectly when appropriately positioned within a cradle adapter as illustrated in FIG. 2, wherein the cradle adapter 200 couples to the portable two-way radio 102 via the wireless or electrical interface. If the portable communication device 100 does not comprise a high audio speaker 104, the cradle adapter 200 can be modified to function as a high audio speaker (as illustrated in FIGS. 3 and 4) by adding a high audio speaker, an amplifier and other functional circuitry within the cradle adapter 200. Alternatively, the cradle adapter 200 can drive the high audio speaker from the portable two-way device 102. The portable communication device 100 and the portable two-way radio 102 negotiate audio routing based on the cradle type and/or user selections. The functional circuitry comprises a switch to detect the presence of the portable communication device 100 and electrical connectors to allow use of the microphone associated with the portable communication device 100 to function as a monolithic speaker/microphone unit. The electrical connectors (not shown) comprise a data port that allows the portable two-way radio 102 to signal the portable communication device 100 when a two-way (dispatch) call is active/received, enabling the portable communication device 100 to abort or temporarily suspend any communication activity (e.g., a cellular telephone call, email processing, data processing, or the like) that may be in progress with respect to the portable communication device 100 functioning in its intended mode of operation.

The cradle adapter 200 preferably has a clip (not shown) attached thereto so that the cradle adapter 200 is capable of attaching to the user's clothing (e.g., epaulet, pocket, etc.) for ease of operability. If it is not required for the portable communication device 100 to be inserted into the cradle adapter 200 to function as a high audio speaker/microphone (i.e., the portable communication device 100 comprises an integral high audio speaker/microphone 104), preferably the portable communication device 100 itself or a protective cradle 108, as illustrated in FIG. 1, comprises a clip (not shown) capable of attaching to the user's clothing. Thus, being able to clip the cradle adapter 200, the protective cradle 108 or the portable communication device 100 itself to the user's clothing makes the portable communication device 100, when coupled to the portable two-way radio 102, a wearable high audio speaker/microphone accessory for use with the portable two-way radio 102.

When the portable communication device 100 is placed into any type of cradle, preferably the portable communication device 100 is positioned with the integrated speaker/microphone 104 facing outward from the cradle as shown in FIGS. 1 and 2, or facing upward from the cradle (not shown) towards the user's face. This arrangement of the portable communication device 100 with respect to the cradle allows the user to hear audio clearly from the speaker or speak clearly into the microphone.

Figure 5:
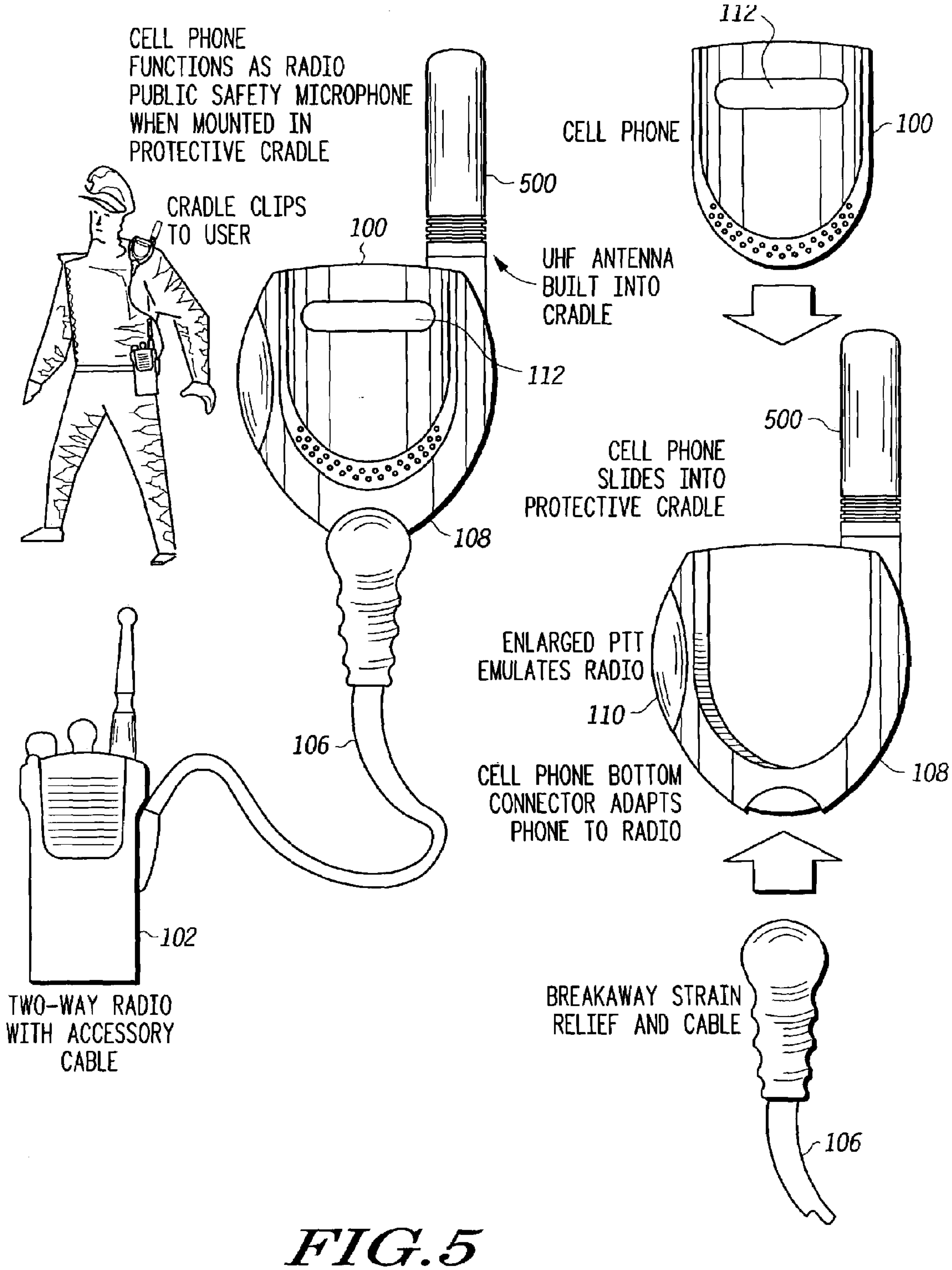
FIG. 5 illustrates an example of a cradle-mounted antenna in accordance with the present invention.

Further, any of the cradles described above can be modified for radio frequency ("RF") improvement via a cradle-mounted antenna in accordance with the present invention. As illustrated in FIG. 5, an antenna 500 for the portable two-way radio 102 is mounted onto the cradle 108 and coupled to the portable two-way radio 102 via the electrical interface through the accessory cable 106 or via the wireless interface. Typically, the antenna 500 is an ultra high frequency ("UHF") antenna, but can be any suitable antenna capable of providing RF improvement for the portable two-way radio 102.

Preferably, the portable communication device 100 and/or the cradle comprise the user ergonomics to operate/control various features of the portable two-way radio 102; thus, the portable two-way radio 102 is not needed to access the user interface. For example, in the present invention, the cradle, and in some cases, the portable communication device 100 has an enlarged push-to-talk ("PTT") button 110 for ease of operability for the user. Typically, when the PTT button 110 is depressed, the portable communication device 100 functions as a high audio microphone for the portable two-way radio 102; when the PTT button 110 is released, or not depressed, the portable communication device 100 functions as a high audio speaker for the portable two-way radio 102. The switching capability in the PTT button 110, as well as the other functionality, such as control signaling, is well known to a person of ordinary skill in the art and will not be discussed in further detail. Thus, as stated above, when coupled to the two-way radio 102, the portable communication device 100 preferably becomes the button/display control device for the two-way radio 102.

Further, the portable communication device 100 and/or cradle also provide additional user interface control of the two-way radio 102 through the use of both hardware and software key or keypad interfaces. If the user interface controls are associated with the cradle, it is preferable that they remain part of the two-way radio functionality even when the portable communication device 100 is separated from the cradle. The methods of soft key or keypad interfaces are evident to those skilled in the art and will not be discussed in further detail.

It is important to note that while the portable communication device 100 is coupled to the portable two-way radio 102, priority is given to the speaker/microphone functionality 104 of the portable communication device 100 when communication over the two-way radio 102 is active (i.e., the portable communication device 100 as used in the two-way radio environment). Precedence given to the two-way radio environment allows this combination of devices to be suitable for public safety or other environments requiring mission critical applications. Thus, the intended/standard mode of operation for the portable communication device 100 can be selectively suspended or temporarily disabled while the portable communication device 100 is coupled to the two-way radio 102, and preferably, when communication over the two-way radio 102 is active. For example, assume that the portable communication device 100 is a cellular telephone and its intended mode of operation is cellular telephone services (e.g., receiving and placing telephone calls over the cellular system). If the user is engaged in a cellular call over the public cellular system and a dispatch (two-way) call over the two-way radio system is received, the cellular call is selectively suspended (i.e., placed on hold, call forwarded, transitioned to a busy signal, or the like) until the communication channel for the private two-way radio system becomes idle (i.e., communication over the two-way radio 102 is not active), in which time, the cellular call is resumed, or until a predetermined time has elapse, at which time, the cellular call is dropped (preferably with a message being provided to the other party of the cellular call). While the cellular telephone 100 is coupled to the two-way radio 102, all cellular calls received by the cellular telephone 100 while communication is active over the two-way radio 102 is directed to voice mail or a prerecorded message until the communication over the two-way radio 102 is no longer active. The user is subsequently notified of any messages that were left while the cellular telephone 100 was functioning as at least one of a high audio speaker and/or microphone accessory for the two-way radio 102. Alternatively, while the cellular telephone 100 is coupled to the portable two-way radio 102, the system can direct all cellular telephone calls to voice mail or a prerecorded message until the cellular telephone 100 is decoupled from the two-way radio 102; this alternative is not as optimal as temporarily suspending a subset of functionality of the portable communication device 100 because it is not likely that the user will carry the portable communication device 100 if a subset of functionality is disabled (i.e., disabling intended functionality of the portable communication device) while coupled to the two-way radio 102.

Figure 6:
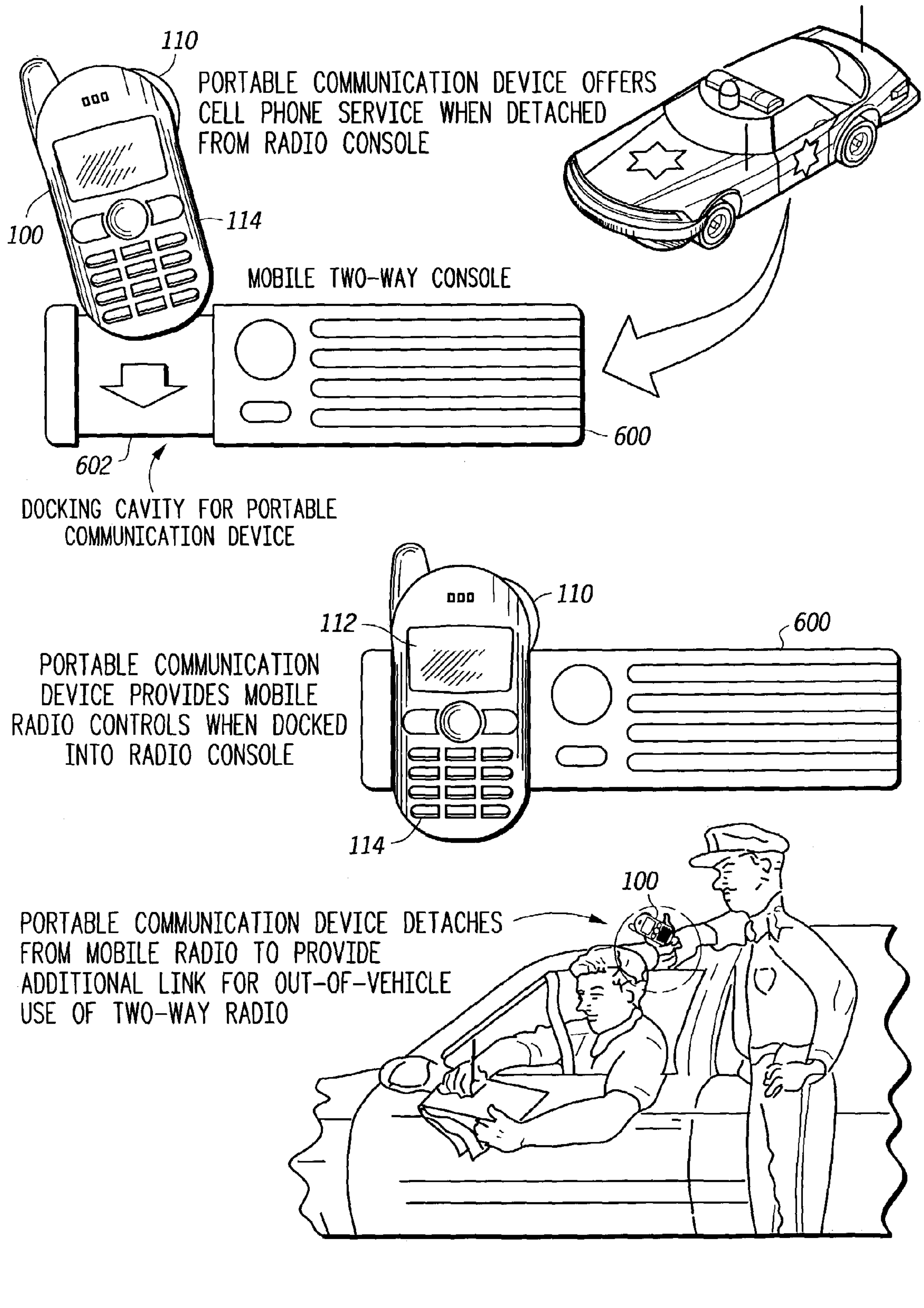
FIG. 6 illustrates an example of a mobile two-way radio console comprising a docketing cavity to couple to a portable communication device in accordance with the present invention.

Turning to a second embodiment, the portable communication device 100, as described above in the first embodiment, couples to a two-way radio console 600 (such as those found in vehicles), thus forming a mobile communication system. Preferably, the mobile two-way radio console 600 provides a docketing cavity 602 for the portable communication device 100 as illustrated in FIG. 6. When the portable communication device 100 is docked into the two-way radio console 600, the portable communication device 100 provides mobile radio controls for the console 600. When detached from the two-way radio console 600, the portable communication device 100 can operate in one of two modes: in a first mode, depending on the range of the portable communication device 100 with respect to the two-way radio console 600, the portable communication device 100 can provide an additional link for out-of-vehicle use for the two-way radio console 600 as described above in the first embodiment; in a second mode, the portable communication device 100 functions in its intended/standard mode of operation as described above in the first embodiment.

Figure 7:
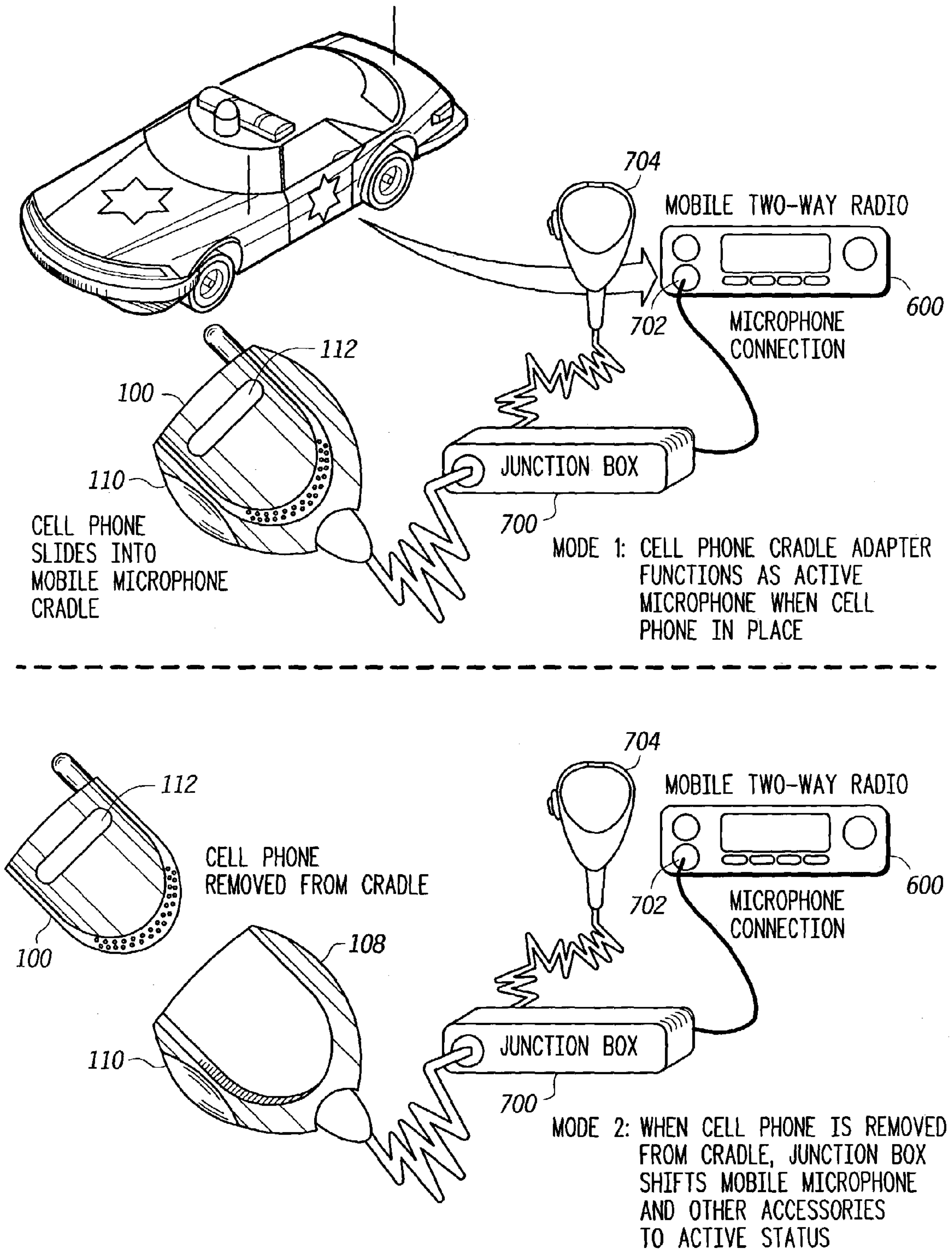
FIG. 7 illustrates an example of a junction box being used to couple the portable communication device to the mobile two-way radio console in accordance with the present invention.

Alternatively, a junction box 700 connects to the two-way radio console 600 via an existing microphone connector 702 as illustrated in FIG. 7. Once the junction box 700 is in place, both the portable communication device 100 (as described in the first embodiment) and a standard mobile microphone 704 (also referred to as a potato microphone) couple to the two-way radio console 600 via the junction box 700. In this configuration, when the portable communication device 100 is coupled to the two-way radio console 600, the portable communication device 100 is active; otherwise, the standard mobile microphone 704 is active. Alternatively, the user can manually select which device will function as the active device. As a result of this configuration, a redundant system is created which allows a user to incorporate the advantages of the portable communication interface into the existing mobile two-way radio systems while having backup of the standard mobile microphone 704 or other accessories.

Figure 8:
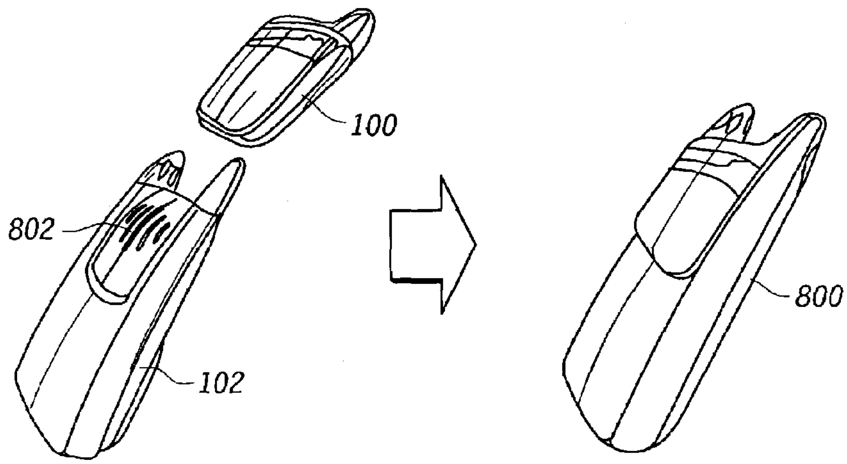
FIG. 8 illustrates an example of combining a portable communication device with a two-way radio to create a temporary monolithic device in accordance with the present invention.

In yet a third embodiment of the present invention, if the portable communication device 100 has an integral high audio speaker 104, the portable communication device 100 can be temporarily made integral to the two-way radio 102 as illustrated in FIG. 8. The portable communication device 100 is docked into the two-way radio 102 to create a monolithic device 800. Once docked, the portable communication device 100 functions as a speaker/microphone for the two-way radio 102; when separate from the two-way radio 102, the portable communication device 100 functions in its intended mode of operation as described above in the previous embodiments. Preferably, the portable communication device 100 and the two-way radio 102 are electrically coupled via a connector 802. This connector 802 contains pins for at least the following functions: a serial interface between the two devices 100, 102; a sensor input (not shown) specifying the presence of the portable communication device 100 being coupled to the two-way radio 102; and a two or four wire charging interface (not shown) between the two-way radio 102 and the portable communication device 100.

When the sensor input indicates that the portable communication device 100 is attached to the two-way radio 102, the user interface/display 112 on the portable communication device 100 allows for the selection of a two-way radio mode. In this mode, the intended functionality of the portable communication device 100 is disabled or selectively suspended and the speaker and microphone 104 will function as a simplex two-way radio.

When the sensor input detects that the portable communication device 100 is no longer coupled to the two-way radio 102, the user interface/display 112 of the portable communication device 100 only allows the portable communication device 100 to function in its intended mode of operation.

The serial interface between the portable communication device 100 and the two-way radio 102 provides for command and control from the keypad/display 114, 112 of the portable communication device 100 and the two-way radio 102. The keypad/display 114, 112 can be used to select modes and/or zones on the two-way radio 102 along with other user information. The status of the two-way radio 102 is transmitted to the portable communication device 100. In this way, the user interface/display 112 on the portable communication device 100 can display status information of the two-way radio 102, such as, transmit indication, synthesizer lock, signal strength indicator, and/or channel coding.

Figure 9:
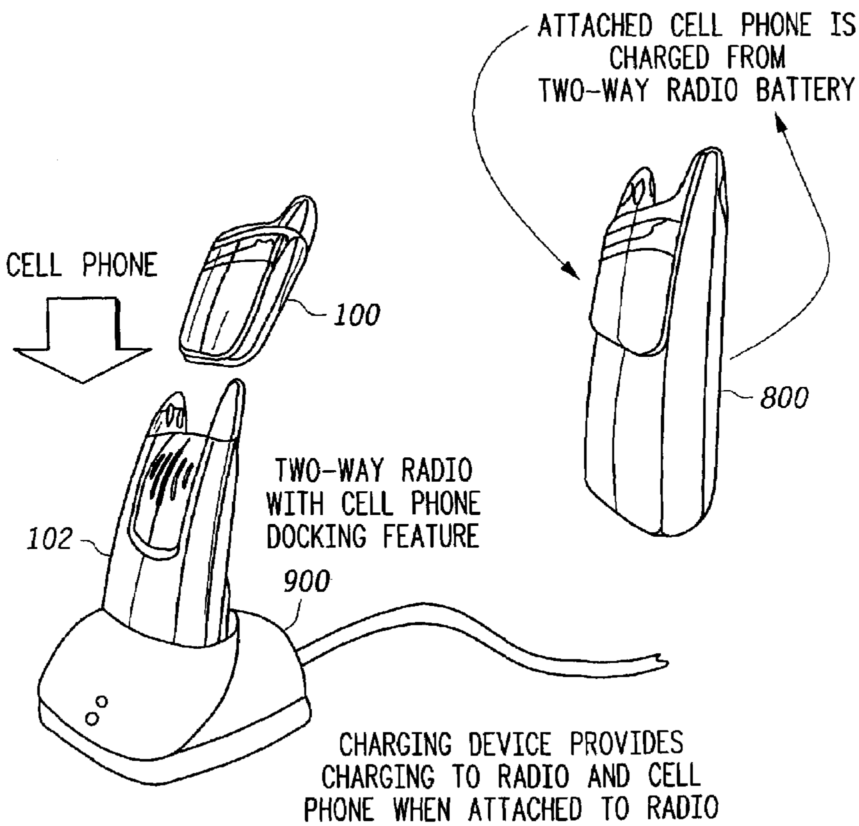
FIG. 9 illustrates an example of a charging device in accordance with the present invention.

When the portable communication device 100 is docked into the two-way radio 102 as a monolithic device 800, a charging device as illustrated in FIG. 9 can charge both devices in accordance with the present invention. A charging circuit (not shown) is incorporated into the charging device 900 that allows an adequate amount of current to flow through both the two-way radio 102 and the portable communication device 100 to charge the batteries (not shown) associated with each device 100, 102.

The charging circuit can charge the batteries of both devices 100, 102 in a variety of ways in accordance with the present invention. Preferably, the batteries are charged in a serial manner. In the serial configuration, the two-way radio 102 can have multiple charging connections for the battery coupled to the two-way radio 102 and the battery coupled to the portable communication device 100. The charging connections for the battery coupled to the portable communication device 100 are routed through the housing of the two-way radio 102 to the interface connector for the portable communication device 100. The interface connector can be a two-wire, four-wire, or any other common charging interface found on batteries coupled to portable communication device (such as batteries used in cellular telephones). Thus, the charging device 900 could charge the two-way radio 102 and then charge the portable communication device 100 or vise versa. The two devices 100, 102 likely have different battery voltages and therefore voltage conversion circuitry (not shown) and voltage/charge regulation circuitry (not shown) may be necessary in order to share energy from one device to another.

Alternatively, the batteries can be charged simultaneously in a parallel manner. In the parallel configuration, the two-way radio 102 may have a traditional two-way radio charger with an n-wire charging interface. The connections provided through the two-way radio housing for charging the portable communication device 100 could provide a separate direct current ("DC") source that is available for charging the portable communication device 100 concurrently with the two-way radio 102.

Yet another alternative is to charge the battery associated with the portable communication device 100 from the battery associated with the two-way radio 102 or vice versa. In this configuration, the DC charging source for the portable communication device 100 is actually the DC supply source from the battery of the two-way radio. This configuration would eliminate the need for duplicate connectors in the charging device 900 for the two-way radio 102 and the portable communication device 100 as described in the parallel configuration. This configuration would also eliminate the need to route the charging wiring through the two-way radio housing.

Thus, in all of the embodiments described above, preferably the portable communication device 100 has at least a storage medium having stored thereon a set of instructions which, when loaded into a microprocessor, causes the microprocessor to perform the following functions: function as an accessory for a two-way radio 102 when coupled to the two-way radio 102; function as a standalone communication device 100 when coupled to the two-way radio 102 and when communication over the two-way radio 102 is not active; and function as the standalone communication device 100 when not coupled to the two-way radio 102.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "set of instructions", as used herein, is defined as a sequence of instructions designed for execution on a microprocessor or computer system. A program or set of instructions may include a subroutine, a function, a procedure, an object method, an object implementation, an executable application, an applet, a servlet, a source code, an object code, a shared library/dynamic load library and/or other sequence of instructions designed for execution of a computer system.

We claim:

1. A mobile communication system comprising:

a two-way radio console having a docking interface formed therein;

a portable communication device capable of coupling to the two-way radio console via the docking interface, wherein the portable communication device provides mobile radio controls when docked into the two-way radio console; and when detached from the two-way radio console, the portable communication device selectively operating in one of two modes: in a first mode, the portable communication device providing an additional link for out-of-vehicle use for the two-way radio console, in a second mode, the portable communication device operating as a standalone communication device.

2. The mobile communication system of claim 1 further comprising a microphone coupled to the two-way radio console.

3. The mobile communication system of claim 2 wherein the portable communication device is active and the microphone is inactive when the portable communication device is coupled to the two-way radio console.

4. The mobile communication system of claim 2 wherein the portable communication device and the microphone are selectively activated.

5. The mobile communication system of claim 1 wherein the portable communication device is selected from a group consisting of a cellular telephone, a personal digital assistant, a pager, and a two-way radio.

6. The mobile communication system of claim 1 wherein the portable communication device is further capable of coupling to the two-way radio console via a wireless interface.

7. The mobile communication system of claim 1 wherein the portable communication device is capable of functioning as the standalone device when communication over the two-way radio console is not active.

8. The mobile communication system of claim 1 wherein at least a subset of functions associated with the portable communication device is temporarily suspended when communication over the two-way radio console is active.

9. The mobile communication system of claim 1 wherein the portable communication device controls at least a subset of functions associated with the two-way radio console.

10. The mobile communication system of claim 9 wherein the portable communication device controls at least the subset of functions associated with the two-way radio console via at least one of the following: a user interface, a display, a keypad, and a soft keypad.

11. The mobile communication system of claim 10 wherein the portable communication device comprises at least one of a user interface, a display, a keypad, and a soft keypad.

* * * * *